United States Patent
Murphy et al.

(10) Patent No.: US 12,359,964 B2
(45) Date of Patent: Jul. 15, 2025

(54) MONITORING OPTICAL FIBERS USING TWO DISSIMILAR ALGORITHMS ON A SINGLE MONITORING SYSTEM

(71) Applicant: Network Integrity Systems, Inc., Hickory, NC (US)

(72) Inventors: Cary R. Murphy, Hickory, NC (US); Daniel M. Goertzen, Winnipeg (CA); Mark K. Bridges, Hickory, NC (US)

(73) Assignee: Network Integrity Systems, Inc., Hickory, NC (US)

( * ) Notice: Subject to any disclaimer, the term of this patent is extended or adjusted under 35 U.S.C. 154(b) by 278 days.

(21) Appl. No.: 17/966,115

(22) Filed: Oct. 14, 2022

(65) Prior Publication Data

US 2024/0125641 A1    Apr. 18, 2024

(51) Int. Cl.
  *G01H 9/00*   (2006.01)
  *G01D 5/353*  (2006.01)
  *G08B 13/186* (2006.01)

(52) U.S. Cl.
  CPC ......... *G01H 9/004* (2013.01); *G01D 5/35361* (2013.01); *G08B 13/186* (2013.01)

(58) Field of Classification Search
  CPC ... G01H 9/004; G01D 5/35361; G08B 13/186
  (Continued)

(56) References Cited

U.S. PATENT DOCUMENTS 11,501,617 B2 * 11/2022 Murphy ............... G01M 11/083
11,703,398 B2 *  7/2023 Lecoeuche .......... G01K 13/223
                                                      374/137

(Continued)

FOREIGN PATENT DOCUMENTS

CN    105784099 A  *  7/2016
CN    106530544       3/2017
(Continued)

OTHER PUBLICATIONS

Wu et al., Multi-point Detection for Polarization-sensitive Optical Time Domain Reflectometry and Its Applications in Electric Power Industry, 2016 Progress in Electromagnetic Research Symposium (PIERS), Shanghai, China, 8-11 Aug. 2016.*
(Continued)

*Primary Examiner* — Stephanie E Bloss
*Assistant Examiner* — Kevin C Butler
(74) *Attorney, Agent, or Firm* — Adrian D. Battison; Ade & Company Inc.; Ryan W. Dupuis (57) ABSTRACT

A method is provided for monitoring optical cable for disturbance events by providing dual monitoring systems where optical signals are received from at least one optical fiber of the cable which are modified by disturbance events. Two separate and distinct algorithms are applied to the received optical signals to generate first and second outputs related to the disturbance event where in a control system information from the first and second outputs is used to determine if an alarm should be issued. The monitoring systems can use a single DAS system and operate on the same data independently preferably using one algorithm which uses ZONE processes to obtain data about different zones in the fiber. Alternatively two DAS systems can be used, one DAS system and one ZONE system or two ZONE systems. In all cases weather data can be used to assist the two algorithms in determining the presence of false alarms.

18 Claims, 7 Drawing Sheets

(58) Field of Classification Search
USPC .......................................................... 73/655
See application file for complete search history.

(56) References Cited

U.S. PATENT DOCUMENTS

| | | | | |
|---|---|---|---|---|
| 2009/0132183 | A1* | 5/2009 | Hartog | ............... G01D 5/35303 |
| | | | | 702/42 |
| 2018/0080812 | A1* | 3/2018 | Wu | ..................... G01H 9/004 |
| 2022/0065690 | A1* | 3/2022 | Han | ................... G01D 5/35358 |
| 2024/0125641 | A1* | 4/2024 | Murphy | ................. G01H 9/004 |

FOREIGN PATENT DOCUMENTS

| | | | | |
|---|---|---|---|---|
| CN | 106530544 | A * | 3/2017 | |
| CN | 108629932 | A * | 10/2018 | ........... G08B 13/124 |
| GB | 2598941 | A * | 3/2022 | ............. G01S 13/04 |
| WO | WO2008119107 | | 10/2008 | |
| WO | WO-2008119107 | A1 * | 10/2008 | ........... G08B 13/186 |
| WO | WO2018017112 | | 1/2018 | |
| WO | WO-2018017112 | A1 * | 1/2018 | ............. G01N 29/04 |
| WO | WO-2018085893 | A1 * | 5/2018 | ......... G01D 5/35361 |
| WO | WO2022046951 | | 3/2022 | |
| WO | WO-2023201389 | A1 * | 10/2023 | |

OTHER PUBLICATIONS

Tejedor et al., Towards detection of Pipeline Integrity Threats using a SmarT fiber-OPtic surveillance system: PIT-STOP project Blind Field Test results, 25th International COnference on Otical Fiber Sensors, 2017, p. 4 (Year: 2017).*

* cited by examiner

MONITORING OPTICAL FIBERS USING TWO DISSIMILAR ALGORITHMS ON A SINGLE MONITORING SYSTEM

This invention relates to a method of or algorithm for analyzing a monitoring signal from optical fibers in an optical cable to detect intrusion attempts and other nefarious or intentional disturbances while reducing the incidence of false and nuisance alarms which can be caused by weather events and/or other spurious noise.

BACKGROUND OF THE INVENTION

This is particularly applicable to perimeter security such as at a fence where an optical fiber extends along at least part of the fence and generates changes in a monitor signal transmitted along the fiber in response to any disturbance of the fiber such as movement or vibration caused by an intrusion attempt such as climbing, lifting or cutting. However the method herein can be used in relation to the monitoring of other fibers which can be moved in response to other types of intrusion events. The term disturbance is used herein as this includes both movement and vibration as the difference between these is subtle. The point is that the intention is to detect any disturbance of the fiber which is indicative of an event to be monitored.

The method is particularly applicable to monitoring systems which operate by introducing a monitoring optical signal into the optical fiber, receiving optical signals from the optical fiber which are modified by events which affect the optical fiber wherein the optical signals are into a plurality of streams, where each stream is associated with a specific respective portion of the optical fiber with the portions divided along the length of the optical fiber so that each stream is indicative of disturbances in the respective portion and wherein each stream comprises a series of data values indicative of the magnitude of the disturbances in the respective portion over time.

One example of a monitoring system of this type is known as Distributed Acoustic Sensing (DAS) where vibrations and displacements cause localized shifts in the path length of the optical fiber. This is detected by a high precision optical Time Domain Reflectometer (OTDR). This OTDR is often referred to as a Phase-OTDR or $\phi$-OTDR, and measures changes in the distance between points of Rayleigh backscatter.

In Rayleigh scatter based distributed fiber optic sensing, a coherent laser pulse is sent along an optic fiber, and scattering sites within the fiber cause the fiber to act as a distributed interferometer with a gauge length approximately equal to the pulse length. The intensity of the reflected light is measured as a function of time after transmission of the laser pulse. When the pulse has had time to travel the full length of the fiber and back, the next laser pulse can be sent along the fiber. Changes in the reflected intensity of successive pulses from the same region of fiber are caused by changes in the optical path length of that section of fiber. This type of system is very sensitive to both strain and temperature variations of the fiber and measurements can be made almost simultaneously at all sections of the fiber.

The sensitivity and speed of Rayleigh-based sensing allows distributed monitoring of acoustic signals over distances of more than 100 km from each laser source. Typical applications include continuous monitoring of pipelines for unwanted interference and for leaks or flow irregularities; monitoring of power cables for unwanted interference and cable faults; monitoring traffic (roads, railways and trains), borders, and other sensitive perimeters for unusual activity; and even oil well monitoring applications where the technology allows the state of the well all along its length to be determined in real-time. The ability of the optic fiber to operate in harsh environments makes the technology especially well-suited for scenarios in which typical sensing systems are unusable or impractical due to environmental conditions.

However other sensing systems than DAS can generate the above streams of data values related to specific points along the fiber.

The above system is highly sensitive and thus can respond well to events but of course the high sensitivity comes at a cost of the higher incidence of false and nuisance alarms. This is particularly a problem where the fiber is open to interaction with outside events such as weather and it is well known and established that the above systems such as DAS have a significant problem yet to be solved of generating false event alarms where the fiber is acted upon by weather events. Up to now no solution to this problem has been identified.

This DAS method is used in the Focus products from Network Integrity Systems and uses the method as shown for example in U.S. Pat. No. 9,002,149 (Rogers) assigned to Fotech Solutions Limited.

The Distributed Acoustic Sensor (DAS) connected to one end of the fiber uses a laser to send thousands of short pulses of light along the fiber every second. A small proportion of the light travelling in a fiber is reflected back by the process known as Rayleigh Backscatter. Vibrations from the surrounding environment, will disturb the light in the fiber and will therefore be observed by the DAS interrogator.

As the data is processed in real time, advanced algorithms can recognize the unique signatures of each type of event. The events that are of concern are reported to the alarm server.

Using advanced AI technology, the system differentiates between background noises and real threats. When acoustic events occur along a fiber optic cable, they are detected by the system, which processes all the acoustic data received and applies its detection algorithms to identify and classify events (e.g. digging, climbing, and pipeline leaks). Using artificial intelligence on the data received, the system determines if an event is a 'threat' to the integrity of an asset and when to raise the alarm.

That is conventional DAS systems when being installed require that the tuning specialist carries out extensive trials on the system to apply sample stimuli to the optical fiber, or the component on which it is mounted for monitoring, at various positions along its length and then to record the response to those sample stimuli as a signature event. This is of course a very time-consuming process which requires different types of the stimuli to be applied at many different locations on the fiber. This generates a large number of signature events for comparison. The system then operates to look for data generated by the signals from the fiber which are similar to or comparable to one of the signature events. Work to improve this system requires the generation of and comparison with a larger number of signature events using AI. The intention is to create a large library of signature events for comparison. However the signature events can still vary with each particular installation so that the same process of applying sample stimuli and generating signature events must be carried out at each new installation.

As part of this system it is known to divide the full length of the fiber into separate sections such as a first and second different fence sections, a gate, a particularly sensitive location within the structure, and the like. This is done as part of the installation and as above each section must be individually analyzed with sample stimuli to generate the signature events for each section.

The system when installed and tuned can then show an operator the precise location of the threat, provide information about what event has taken place and give the operator the opportunity to make a timely and proportionate response. The DAS system includes a highly configurable sensor, which means that the laser pulse frequency, pulse width and many other parameters can be controlled enabling the system to be tuned to each customer's specific requirements.

The alarm management server provides accurate and actionable alarms and displays them on a map. Also the user can automatically record targeted segments of data, and store, replay, and evaluate that data. These data segments can be used to enhance and refine existing detection systems, or to create new detection parameters.

DAS systems thus typically require the above calibration and fine-tuning process that resembles a combination of science and art. This is very time consuming, and the performance of the system is reliant upon the skill of the tuning specialist.

In addition, DAS systems are challenged with nuisance alarming during inclement weather. This is because the weather events can generate data in the signal from the fiber which closely match the signature events previously recorded. A common approach is to suppress alarms during said weather, effectively deafening the system. The high rate of nuisance alarms is taxing to the monitoring system and infuriating to the end user.

Thus the present invention addresses some common challenges with DAS, particularly but not exclusively, when used for perimeter security systems and particularly to arrangements for reducing the incidence of false and nuisance alarms caused by outside events.

Nuisance alarm occurs when a unit detects an actual event that is not related to an intrusion. This might be caused by poor installation, cable maintenance, accidental perturbation, etc.

False alarm occurs when an otherwise functioning device issues a spurious alarm for no apparent reason.

DAS, particularly when fence mounted, is vulnerable to extreme weather conditions such as wind and rain. Due to the nature and significant sensitivity of the DAS system, weather phenomena may overwhelm the signal. This can cause the system to experience diminished or compromised sensitivity to detection of the event that it has been implemented to catch. It is not unheard of in the industry for a DAS or similar system to simply exhibit decreased sensitivity during extreme weather conditions, enabling a cognizant nefarious party a window of opportunity.

The above weather induced shortcoming can be minimized with optimized fence quality and tuning skill. With a fence that meets strict requirements, coupled with expert tuning, the DAS systems are not doomed to the weather vulnerability. Rather, weather raises the level of effort required for a successful installation.

The DAS system is particularly effective in that, for example, it is used as a perimeter security system on a fence, the equipment or personnel monitoring the system will be alerted not only to the event, but also to the precise location of that event, supporting carrying out a Standard Operating Procedure or dispensing security personnel. In typical installation an optical cable will be attached to a fence or other perimeter demarcation, and that optical cable will be monitored and analyzed for vibration or movement indicative of cut, climb, fence lift, or other type of breach.

Zone products produced in the market, such as the Sentinel II and Vanguard products manufactured by Network Integrity Systems offer a large advantage and a large disadvantage when compared to DAS.

The disadvantage is, as zone products, discrimination of the location of an event is limited to a "zone". This zone might be a fence along the entire side of a facility which might require a visual inspection or the addition of Point/Tilt/Zoom (PTZ) cameras.

The advantage is that very sophisticated algorithms have been developed for the zone products which greatly simplify the tuning process to reduce false alarms.

SUMMARY OF THE INVENTION

It is one object of the present invention to provide a method or system for analysis of the data from a system of this type such as DAS which reduces the incidence of false and nuisance alarms.

According to the invention there is provided a method for monitoring an optical cable containing at least one optical fiber for disturbance events of the optical cable comprising:
   introducing a monitoring optical signal into said at least one optical fiber;
   receiving optical signals from said at least one optical fiber which are modified by disturbance events on said at least one optical fiber;
   wherein the optical signals are divided into a plurality of data streams, where each data stream is associated with a specific respective portion of the first optical fiber with the portions divided along the length of the first optical fiber so that each data stream is indicative of disturbances in the respective portion and therefore of disturbances in the optical cable at the respective portion;
   wherein each data stream comprises a series of data values representative of the disturbances over time in the respective portion;
   applying a first algorithm to the data streams;
   in response to the first algorithm generating a first output related to a disturbance event;
   applying a second algorithm different from the first algorithm to the series of data values representative of the disturbances over time in the respective portion;
   in response to the second algorithm generating a second output related to the disturbance event;
   and in a control system using information from the first and second outputs to determine if an alarm should be issued.

According to the invention there is provided a method for monitoring an optical cable containing at least one optical fiber for disturbance events of the optical cable comprising:
   in a first monitoring system, introducing a monitoring optical signal into said at least one optical fiber;
   receiving optical signals from said at least one optical fiber which are modified by disturbance events on the first optical fiber;
   wherein the optical signals are divided into a plurality of data streams, where each data stream is associated with a specific respective portion of the first optical fiber with the portions divided along the length of the first optical fiber so that each data stream is indicative of disturbances in the respective portion and therefore of disturbances in the optical cable at the respective portion;

wherein each data stream comprises a series of data values representative of the disturbances over time in the respective portion;

applying a first algorithm to the data streams;

in response to the first algorithm generating a first output related to a disturbance event;

in a second monitoring system introducing a second monitoring optical signal into said at least one optical fiber; receiving optical signals from said at least one optical fiber which are modified by disturbance events on said at least one optical fiber;

applying a second algorithm to the received optical signals;

in response to the second algorithm generating a second output related to the disturbance event;

and in a control system using information from the first and second outputs to determine if an alarm should be issued.

According to the invention there is provided a method for monitoring an optical cable containing at least one optical fiber for disturbance events of the optical cable comprising:

in a first monitoring system, introducing a monitoring optical signal into said at least one optical fiber;

receiving optical signals from said at least one optical fiber which are modified by disturbance events on said at least one optical fiber;

applying a first algorithm to the received optical signals;

in response to the first algorithm generating a first output related to the disturbance event;

in a second monitoring system introducing a second monitoring optical signal into said at least one optical fiber;

receiving optical signals from said at least one optical fiber which are modified by disturbance events on said at least one optical fiber;

applying a second algorithm to the received optical signals;

in response to the second algorithm generating a second output related to the disturbance event;

and in a control system using information from the first and second outputs to determine if an alarm should be issued.

According to the invention there is provided a method for monitoring an optical fiber for disturbance events of the optical fiber comprising:

introducing a monitoring optical signal into the optical fiber;

receiving optical signals from the optical fiber which are modified by disturbance events on the optical fiber;

wherein the optical signals are divided into a plurality of data streams, where each data stream is associated with a specific respective portion of the first optical fiber with the portions divided along the length of the first optical fiber so that each data stream is indicative of disturbances in the respective portion and therefore of disturbances in the optical cable at the respective portion;

wherein each data stream comprises a series of data values representative of the disturbances over time in the respective portion;

in a control system applying an algorithm to the data streams;

in response to the algorithm generating a first output indicative of a detection of a disturbance event;

wherein the algorithm includes a component by which weather events on the cable are determined and used in combination with the first output to determine whether a full alarm condition should be signaled.

As described in more detail hereinafter, the primary use of this invention is to use a single DAS unit on a single fiber monitoring a perimeter fence. In this embodiment, the signal from the fiber is digitized within the DAS as usual, and is passed to two independent internal processing paths, usually independent software paths run on the same processing hardware simultaneously, each running independent detection algorithms. One processing path will run standard DAS detection algorithm that is common and currently used. The other path is intended to implement different code, such as the detection algorithm described in in co-pending U.S. patent application Ser. No. 17/946,533 (Murphy) of the present Applicant referenced hereinafter.

This is done as the algorithm described in this application, which uses zone algorithms referenced hereinafter, is excellent at ambient disturbance suppression, such as wind, while maintaining high performance in intrusion detection. The DAS algorithm is less able to detect intrusions in the presence of inclement weather, yet maintains the ability to determine the precise location of an event. Using the two simultaneously offers the best of both worlds solution of detecting intrusions in the presence of weather, and potentially determining or estimating the location.

Additionally, applying two separate algorithms within the same unit affords the ability to use the two detection results as a double check to each other. This is similar to the implementation of which uses a DAS system and a zone system, but within the single DAS unit with no external componentry.

That is preferably the control system uses the comparison taken from the second monitoring system or algorithm as a double check to confirm an existence of an event, thereby reducing the incidence of false and nuisance alarms.

Preferably the first monitoring system is primary and the second is used by the control system as a secondary check on the first.

In a preferred embodiment, when the first system indicates a disturbance event, the control system looks at locations on either side of the event to determine if the event is confined to a pre-determined width and if less than the predetermined width the control system issues an alarm and reports the location and, if the event is greater than the predetermined width, the control system determines that the event is caused by weather and it issues an alert but not an alarm. That is a single detection, such as with one device, is called herein an alert or warning, and two devices in agreement is determined to be an alarm indicating a full alarm condition.

In a preferred embodiment the control system determines whether the second monitoring system is indicating a disturbance event and, when it is not, the control system does not issue an alarm and, when it is, the control system tells the first system to look for the most likely event location during a past period and in a next period. That is the second system using a zone algorithm sees alarm on a zone, while the DAS system does not have a clear detection but sees some localized activity. This can be reported as an alert with a "likely" location.

In a preferred embodiment, when an alarm is issued, the control system requests that a Camera respond to the location of the event.

In a preferred embodiment an anemometer is provided and the control system obtains a wind speed from the anemometer and uses the value in a determination of whether to issue an alarm. In the preferred embodiment the control system preferably obtains a wind speed from the anemometer and issues an alarm if the first and second system both indicate an event even when the wind speed exceeds a predetermined value and, when only one of the first and second systems is indicating an event, the control system issues an alert but does not issue an alarm. if the wind speed exceeds the predetermined value. However, if the wind speed is high or above a threshold, the zone system can still issue alert by itself.

In a preferred embodiment the existence of extreme weather is determined by various methods including: rain gauge, anemometer, or combination of these, or connection to a weather reporting service. These are transmitted to the control system and used in the analysis by which the comparison is used and the above data is considered. That is the weather information acts as a gate to enable or suppress alerts or events.

In one embodiment, the second monitoring system is similar to the first, such as a DAS system, and includes:
   introducing a second monitoring optical signal into the second optical fiber;
   receiving optical signals from the second optical fiber which are modified by disturbance events on the second optical fiber;
   wherein the optical signals are divided into a plurality of data streams, where each data stream is associated with a specific respective portion of the second optical fiber with the portions divided along the length of the second optical fiber so that each data stream is indicative of disturbances in the respective portion and therefore of disturbances in the optical cable at the respective portion;
   wherein each data stream comprises a series of data values representative of the disturbances over time in the respective portion;
   and applying the algorithm to the data streams.

That is, in one embodiment two separate DAS systems are used and processed individually. This can use a single fiber or more preferably can use two separate fibers to avoid interference and simplify separation of the signals.

As discussed above in one particularly preferred arrangement a single DAS arrangement can be used with the data provided as two data streams which are processed separately using different algorithms to act as an internal check on the validity of the event determinations.

In this method using similar monitoring systems such as DAS, the first and second monitoring systems can use one of more of the following:
   different parameters or settings for the dual dissimilar algorithms such as frequency, wavelength;
   opposite directions of rotation about the fiber along the full length of a perimeter.

Preferably the method includes supplying virtual or soft dual functionality on a single fiber within a single DAS system. The two analysis processes within the DAS unit employ different algorithms that is a standard DAS algorithm on one and a zone algorithm on the other. In this way, a single unit and single fiber can implement the benefits of this arrangement. However the system may use two separate systems operating on one or two fibers.

In another embodiment, the second monitoring system is dissimilar from the first in that it can comprise a zone monitoring system which is responsive to optical signals received from a selected length of the second optical fiber defining a monitoring zone which are modified by disturbance events in the zone of the second optical fiber and form a single stream of data from the zone.

Preferably in this embodiment, the second monitoring system as a zone monitoring system can use one of more of the above zone monitoring systems and thus can include an algorithm including:
   carrying out a frequency and/or time dependent analysis on each block of the streams to create at least one coefficient dependent on the data values;
   comparing said at least one coefficient with a coefficient value;
   and in response to said comparing generating the output indicative of a detection of an intrusion event.

Preferably in this embodiment, the second monitoring system as a zone monitoring system can use the above zone determination system where the cable is divided into separate zones along its length and the second monitoring system monitors each of the zones independently and determines when an event is detected which zone the event occurred.

Preferably in this embodiment, the control system in response to the determination of the zone concerned looks for alarm from the first monitoring system in a length of the cable corresponding to that zone.

Preferably in this embodiment, the control system, when an event is confirmed by the zone monitoring system, the control system tells first system to look for the most likely event location in a past time period and a next time period. That is, essentially the zone system says "watch", the DAS looks at events over time to see what is going on. The time period used can be any length of time, and is not limited to the next sample.

Preferably in this embodiment, there is provided an anemometer and, in response to the zone monitor system saying that there is an alarm, the control system asks the anemometer for wind speed. Thus in the event that the wind speed is below a threshold, the control system does not use the wind speed in the determination.

In one embodiment of the above dissimilar systems, the zone monitor system is primary and the first monitoring system is secondary and used for a comparison check.

Preferably in the embodiment of the above dissimilar systems, in the presence of extreme weather, if the first monitoring system registers a wide alarm size, the control system assumes that this is an indication of weather events sufficient to interfere with the proper analysis and discards the event detected by the first monitoring system and relies only on the zone monitoring system.

Preferably in one end use the cable is used for monitoring a perimeter security system where the optical cable extends along at least a part of the perimeter security system and said disturbances of the optical fiber are caused in response to intrusion events on the perimeter security system.

Preferably the above analyses can compensate for noise on the fiber caused by weather sufficiently for the system to detect standard intrusions in the presence of weather conditions such as wind and rain. This is contrary to a conventional DAS system which typically Is unable to detect intrusions in the presence of weather events.

As one example, the analysis of either or both of the first and second systems can be frequency or time based as described in the patents cited herein and may particularly use a Fourier transform to generate the coefficients for comparison with a threshold.

In this arrangement it is an important feature that the algorithm is based on determining differences from ambient disturbances and does not use recorded signatures from sample stimuli applied to the optical fiber as described above in relation to the above DAS systems. Thus the system herein carries out an analysis which looks for differences from an expected status rather than the prior art DAS system which tries to compare the data with known signatures of known events. The zones or areas of monitoring can be selected so that the length of the fiber that is being analyzed by the selection of a particular block can be tailored to the structure of the object being monitored, such as a perimeter fence with gates.

This system can be used with advantage in an arrangement for automatically changing a sensitivity of the analysis to accommodate changing noise or ambient disturbance on the fiber.

In one example of the algorithm to which the data values are applied, a transform function is used to convert selected temporal sequences of digital samples into a set of frequency dependent transform coefficients and wherein the set of transform coefficients is compared against an envelope where the envelope is a block of coefficients the same size as the set of transform coefficients and indicating an intrusion event if a transform coefficient exceeds an envelope coefficient by a predetermined threshold value. The transform function can comprise a Fourier transform or a Wavelet transform. Thus typically, when the transform coefficient is greater than the envelope coefficient but by a value less than the threshold value, the envelope coefficients are changed to make the analysis less sensitive to accommodate increasing environmental noise conditions by increasing the envelope coefficients to a larger value and the envelope coefficients are decayed over time by periodically reducing each envelope coefficient by a decay value so as to make the analysis more sensitive to accommodate decreasing environmental noise conditions by decreasing the envelope coefficients to a smaller value. In this analysis preferably each transform coefficient of the set of transform coefficients is compared against a respective associated one of a set of envelope coefficients of the block of coefficients and an intrusion event is indicated if at least one transform coefficient exceeds the respective associated one of the envelope coefficients by the predetermined threshold value;

In order to improve sensitivity adjustment, in respect of those analyses where an intrusion event is detected, the envelope coefficients are preferably not increased to a larger value;

In order to improve sensitivity adjustment, the changing of the envelope coefficients to increase the envelope coefficients to a larger value is preferably delayed by a time of a plurality of cycles. For example, the changing of the envelope coefficients is delayed by storage of values in a buffer and, in the situation where an intrusion event is detected, the values stored in the buffer are discarded.

In order to improve sensitivity adjustment, there is preferably provided for each envelope coefficient a floor value and when envelope coefficients are decayed to a decay value below the floor value, that envelope coefficient is replaced with the floor value.

While the system herein can be used in many other sensing devices as discussed above, it finds particular advantage for use in monitoring a perimeter security system where the optical fiber extends along at least a part of the perimeter security system and said disturbances of the optical fiber are caused in response to intrusion events on the perimeter security system. In this case, the analysis compensates for noise on the fiber caused by weather sufficiently to detect standard intrusions in the presence of said weather conditions such as wind and rain.

Depending upon the application or system being monitored, the data can represent subsets of data in either streaming data as a representation of distance or data as a representation of elapsed time. A common method for representing the signal exiting a DAS system is called a "waterfall".

In the arena of perimeter security, installing an optical fiber on a fence allows some benefits:
As glass contains no conductors, fiber optic sensors are inherently resistant to common electrical issues such as the need for local power for the sensor;
As the fiber optic sensor contains no metal conductors, resistance to effects of lightning causing damage to the head end interrogator;
As there is no electrical conductor, there is a decrease in shock hazard;
No bonding of the conductors or shields is required.

For example, a fence that is unprotected and runs perpendicular to the direction that the wind is blowing will indicate a disturbance over the entire exposed length. Conversely, an intruder cutting through the fence with a bolt cutter will create a very narrow disturbance. The system can evaluate the width of the disturbance and use that information to select the width of the block or signal for analysis. A wind event, therefore, will be treated as a single zone or block for purposes of analysis. A cut intrusion will be focused in on the narrow excitation, so as to select a very narrow block, reducing interference from adjacent areas of fence by discarding those streams in those areas into other blocks.

In this manner, all or part of a linear portion can be thought of as though it were one zone in a zone monitoring system. For example, if 150 m of fence is to be monitored with no need for information regarding the location of an intrusion attempt, the entire length can be treated as a single zone. Averaging all of the points horizontally along a region and feeding that into a zone-type detection algorithm is functionally identical to monitoring the same section of fiber as a single zone with a non-locating monitoring device. This can be applied during installation of the system to portions as wide or narrow as is appropriate for the application, such as a length of fence which is easily viewed, or as a gate which has a length of fiber attached to it but is treated as a single entity with no need for location information.

The algorithms that can be used from existing zone products have the advantage is that very sophisticated algorithms have been developed for the zone products which greatly simplify the tuning process.

Zone products are described in the U.S. Pat. Nos. 7,092,586; 7,206,469; 7,403,675; 7,376,293 and 7,693,359 by the present applicants which are cited here for reference. Additionally U.S. Pat. No. 11,190,271 is referenced for so-called Boolean Logic detection algorithm which allows discriminating locations or distance by analyzing monitored zones in combination.

The disclosures of each of the patents cited herein are incorporated by reference.

Some detection algorithms to be used in one or both of the system can include the following:

The arrangement shown in U.S. Pat. No. 7,634,387 (Murphy) of the present Applicant issued Dec. 15, 2009 which discloses an algorithm in which the signal which varies over time is monitored to determine an alarm condition, where the sample stream of digital values from an A/D converter is divided in to equal length pieces and a Fourier Transform (FT) algorithm is used to transform each piece of the stream into a three dimensional dataset including frequency domain amplitude, frequency and time. A Frequency Envelope is calculated by taking the maxima over the time dimension for a period of time, leaving a two-dimensional frequency domain amplitude vs frequency dataset which is compared with new data arriving to determine the alarm condition for each element of the Frequency Envelope either by applying a constant delta additively or multiplicatively or by using a "leaky bucket" algorithm.

The arrangement shown in U.S. Pat. No. 11,055,984 (Murphy) of the present Applicant issued Jul. 6, 2021 which discloses an algorithm which provides a method of detecting intrusion events including at least two different event types which have different characteristics of frequency and time comprises providing a sensor responsive changes in a medium generated by a potential intrusion event with the sensor generating an output signal indicative of the changes in the medium, analyzing the signal to determine changes in amplitude so as to detect the change in amplitude of the detection signal as a function of time, and performing at least one of: (i) in the frequency domain, carrying out a frequency analysis of the signal from the sensor and dividing the frequency analysis into separate sections which are selected so as to correspond to the characteristic frequencies for each event type, or (ii) the algorithm requiring the presence or absence of a time domain step function.

The arrangement shown in co-pending U.S. patent application Ser. No. 17/583,611 (Murphy) of the present Applicant filed Jan. 25, 2022 entitled Method Of Analyzing A Monitoring Signal From A Sensing System To Determine An Alarm Condition which discloses an algorithm where the monitoring signal is provided as a stream of digital values which are analyzed using a frequency-based or time-based algorithm to generate a plot of elements, applying a delta to each element of the plot of elements to adjust sensitivity thereof to provide a threshold and comparing a plurality of the elements of the stream with the threshold and triggering the alarm condition in the event that the threshold is exceeded; where the algorithm is changed in different time periods in response to ambient conditions of the environment determined for those time periods.

The arrangement shown in co-pending U.S. patent application Ser. No. 17/980,359 (Murphy) of the present Applicant filed Aug. 18, 2022 entitled Intrusion Detection Algorithm with Wind Rejection Heuristic which discloses an algorithm where the monitoring signal is provided as a stream of digital values which are analyzed using a frequency-based transform to generate a set of transform coefficients which are compared to a set of envelope coefficients. The sensitivity of the analysis is automatically controlled to accommodate environmental noise on the fiber by increasing the envelope coefficients to make the analysis less sensitive at each cycle by adopting the larger value from the comparison and by decaying the envelope coefficients at each cycle over time to a smaller value down to a floor value.

The arrangement shown in co-pending U.S. patent application Ser. No. 17/946,533 (Murphy) of the present Applicant filed Sep. 16, 2022 entitled Intrusion Detection Algorithm with Reduced Tuning Requirement which discloses that an optical fiber is monitored for an intrusion event where returned optical signals are divided into streams each associated with a respective location on the optical fiber. Blocks of the streams are selected each containing a plurality of streams and the streams are collated, for example by averaging, to create a single stream to which an algorithm is applied to create coefficients which are compared with a threshold value to generate an output indicative of disturbance of the fiber by an intrusion event. Each block representative of a length of the fiber is thus treated as a zone and the detection algorithm is applied to each. This creates a DAS system that does not require unique tuning as each zone is independently monitored. Applying the above zone principles and algorithms to the DAS system also provides a high level of nuisance alarm and false alarm rejection The disclosures of each of the above cited applications and patents are incorporated herein by reference.

DETAILED DESCRIPTION

A significant challenge to monitoring a fence with a fiber optic vibration and motion detecting sensor is the detection of an intrusion in the presence of strong weather such as wind or rain. Typically, systems will suppress false alarms in the presence of strong weather, however that introduces a vulnerability wherein a nefarious operator with knowledge of the system would wait for a weather event for scheduling an intrusion.

Figure 1:
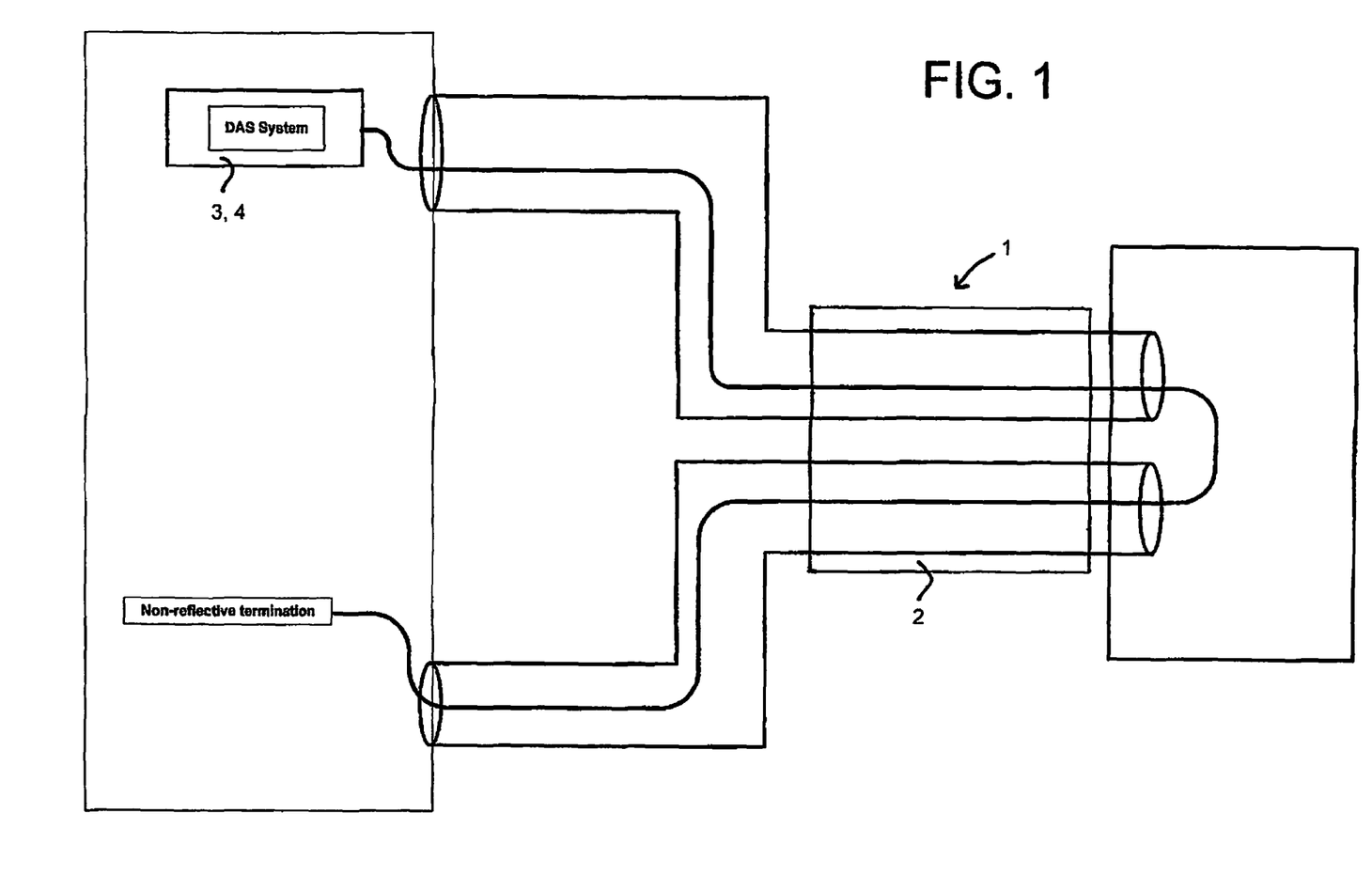
FIG. 1 shows a length of a perimeter fence which includes an optical fiber attached thereto which acts as a monitor of disturbances indicative of an intrusion event and shows schematically the basic components of the monitoring system according to the present invention.

This invention outlines the application of the detection algorithms developed for zone products for application to portions of data collected or reported by the locating system shown in FIG. 1.

There is an optical sensing system shown in FIG. 1 provided by an optical fiber 1 mounted on a fence 2 covering the protected perimeter. This can cover the whole perimeter or may be divided into sections such as particularly sensitive areas.

The optical sensing system provided by the optical fiber 1 is sensitive to vibration and movement. Thus the fiber 1 acts to encode vibration and movement into the light passing through the monitoring fiber from a transmitter 3 so that the signals transmitted are modified and reflected to a receiver at the head end. In this arrangement known as DAS the receiver is arranged to be responsive to the intensity of the signal which is measured as a function of time after transmission of the laser pulse. When the pulse has had time to travel the full length of the fiber and back, the next laser pulse can be sent along the fiber. Changes in the Coherent Rayleigh Noise (CRN) of successive pulses from the same region of fiber are caused by changes in the optical path length of that section of fiber. The magnitudes of the changes depend on the strength and type of disturbance acting on the fiber. This type of system is very sensitive to both strain and temperature variations of the fiber and measurements can be made almost simultaneously at all sections of the fiber.

As shown in Figures, the signal is transmitted from the transmitter 3 into the fiber 1 so as to introduce a monitoring optical signal into the optical fiber 1. The reflected signals are received by the receiver 4 so as to receive optical signals from the optical fiber which are modified by events which affect the optical fiber.

As is known in the art, the DAS receiver acts to divide the optical signals into a plurality of streams S1 to SN, where each stream is associated with a specific respective portion P1 to PN of the optical fiber with the portions P divided along the length of the optical fiber so that each stream is indicative of disturbances in the respective portion P. Each stream S1 to SN comprises a series of data values indicative of the magnitude of the disturbances in the respective portion over time. This output is known as a "waterfall" and is a well-established output from a DAS system.

These portions or streams can be collected in a variety of ways, representing a variety of data sets. These collection methods known to persons skilled in the art and available in the data from system used in practice such as DAS can be:
  Streaming raw;
  Streaming Internally processed;
  Internally processing within the locating system itself;
  Recording and transporting to a processor.

Additionally, depending upon the application the data can represent subsets of data in either streaming data as a representation of distance or data as a representation of elapsed time.

Figure 3:
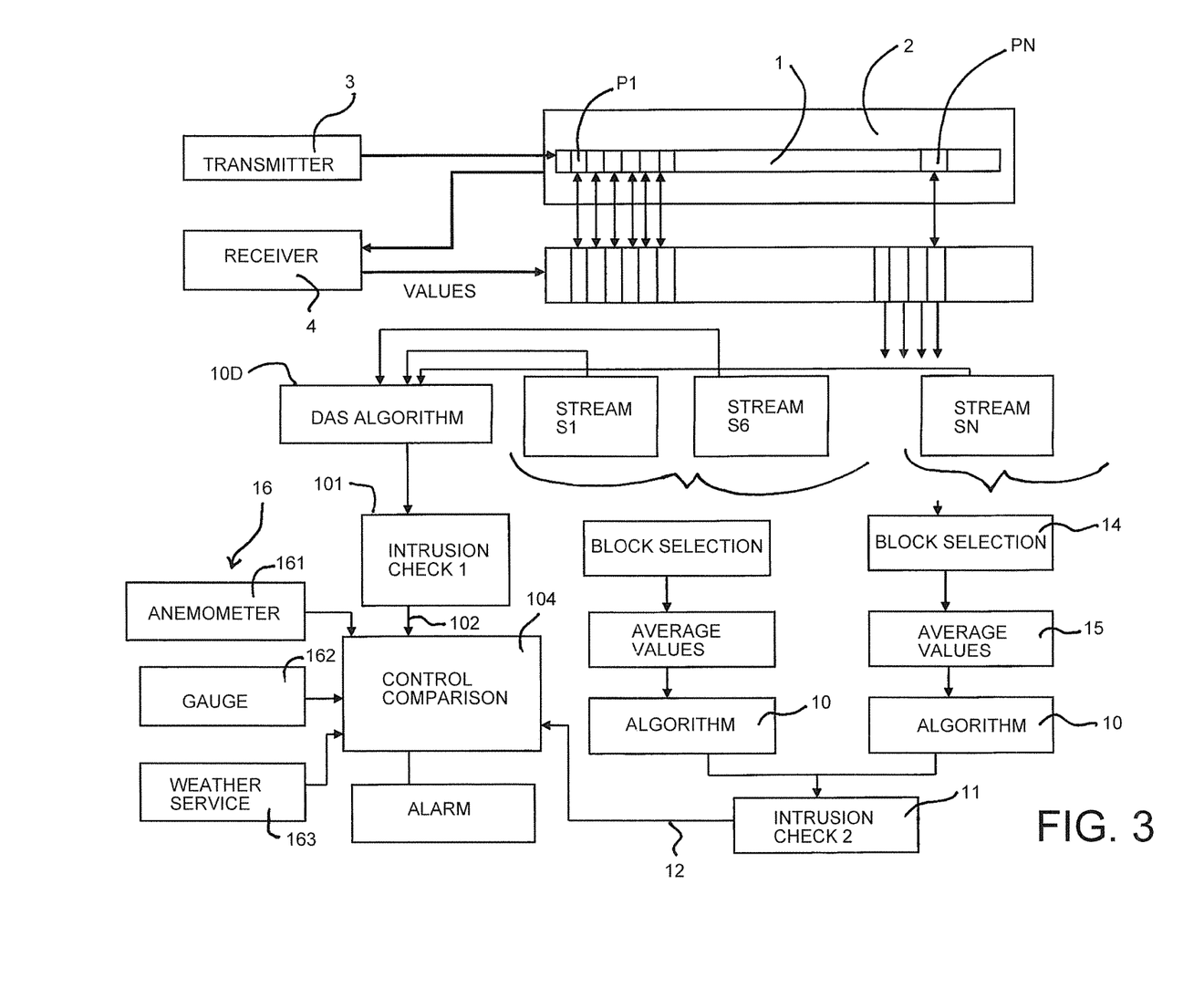
FIG. 3 shows further steps of a first embodiment of the method according to the present invention shown graphically in FIG. 2 including the first and second algorithms using on a single DAS system.

In this arrangement, the signals are used in two separate operations on the DAS data including two separate algorithms where a first is conventional DAS algorithm 100, the construction and operation of which is well known to persons skilled in the art. In this first operation or algorithm, the optical signals are divided into a plurality of data streams S1 to SN, where each data stream is associated with a specific respective portion of the first optical fiber with the portions divided along the length of the first optical fiber so that each data stream is indicative of disturbances in the respective portion and therefore of disturbances in the optical cable at the respective portion. Each data stream thus comprises a series of data values representative of the disturbances over time in the respective portion. The data streams are fed to the first algorithm 100, which in known manner in an intrusion check system 101, generates a first output 102 related to a disturbance event.

In the second operation or algorithm, the captured signal streams S1 to S6 are applied to a second different algorithm 10 which provides data to an intrusion detection system 11 for carrying out a frequency and/or time dependent analysis on each block of the streams to create at least one coefficient dependent on the data values, comparing the coefficients thus generated in the intrusion check 11 with a coefficient value such as a threshold and in response to said comparing generating an output 12 indicative of a detection of an intrusion event.

The algorithm can use known systems such as Fence Detect, Smart Filter Detection (SFD), or Intrusion Signature (IS) as identified above.

The second algorithm is therefore used on the data vertically up the waterfall. This allows for zooming in on a specific location on the fiber or the object being monitored of any desired selected width and treat that data stream as though it were the solitary reading over time of a zone system. The nature of DAS contains a great deal of randomness and noise on a signal. Averaging of this signal at a zone or block of the streams of data on the waterfall in a step 15 can reduce the randomness while preserving the true signal.

Dependent upon the processing capabilities of the system, it might be advantageous or necessary to utilize time division multiplexing to scan from block to block to perform this detection analysis. This is of course less desirable than monitoring and detecting the blocks within all portions simultaneously but processing capability restrictions may require this to be adopted.

In the output, the horizontal axis of the waterfall represents signal verses distance. That is, left to right indicates distance from some origin to a linear sensor extending to a location or along the fiber. This can be divided or a sample used to act as a "zone" of interest. For example, in a 2 km installation it is possible that only the section of a gate, for example, from location spanning 1.2-1.3 km. It is possible to isolate just that portion for analysis.

The vertical axis indicates signal at each of these locations as it changes over time thus forming the streams S1 to SN. Analyzing the vertical axis allows analysis of zones as small as the sampling rate of the interrogator, or as large as the entire span. These widths can be defined for areas such as a gate, and can be dynamically altered.

In the zone sensor systems, the aggregate data from the entire length of sensor is streamed into the detection algorithms over time, representing change over elapsed time without consideration of location along the sensor.

The receiver 4 is divided into or includes sections which act to receive and analyze the signal emitted from the fiber to extract the required components, provide suitable filtering and to generate the required output. The data is divided into streams where each stream is associated with a respective location on the fiber. The data output on each steam is converted into a stream of digital data or values. Arrangements for these functions are well known and commercially available.

Figure 2:
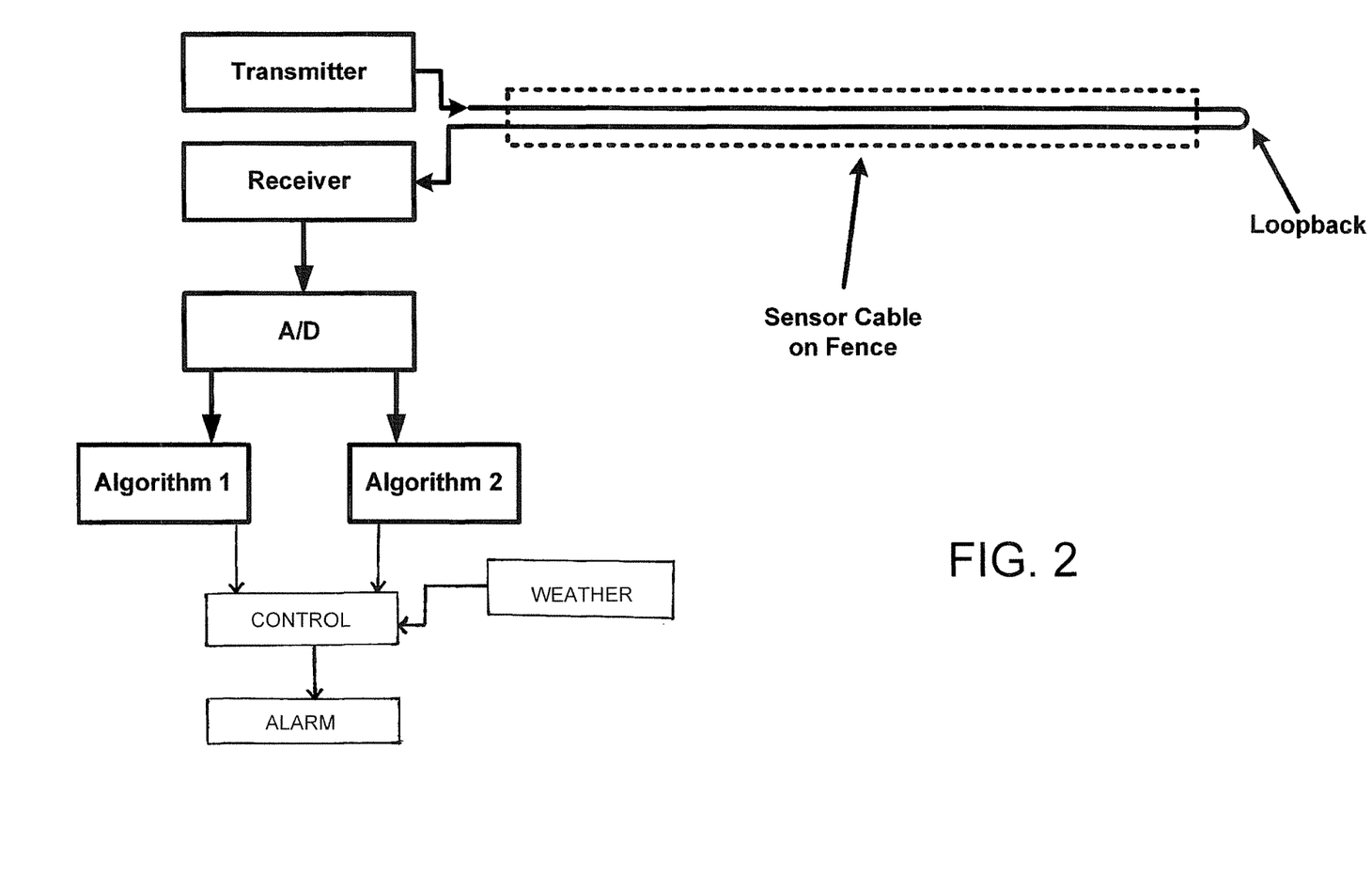
FIG. 2 shows some steps of the method according to the present invention shown graphically in FIG. 1.

At step 14, a selection is made of certain streams to be formed into a block of streams. As above, typically there is a plurality of blocks of the streams where each contains a plurality of streams. However the number of blocks can be smaller or larger and the number of streams can be larger or smaller. The blocks can have different number of streams depending on the location on the fiber. The selection step 14 can be carried out at installation depending on the geometry of the installation or can be carried out dynamically by changes detected during the analysis.

In step 15 for each block, the data values of the plurality of streams in the block are collated to form a single stream of data for the algorithm. This is typically done by averaging the data horizontally but other collations methods may be used.

The number of streams in each block is selected to select desired sections of the length of the optical fiber and the number of streams in each block is variable. In some cases at least one block is selected so as to monitor an entire length of the optical fiber or a portion thereof.

A width of the blocks defined by the number of streams therein, that is the number of streams in each block, is dynamically changed for example in response to changes in environment.

Thus the number of streams in at least one block is different from the number of streams in at least one other block and can be selected at installation or changed dynamically during operation. Thus the number of streams each block is varied depending on detected changes on the object to be monitored and/or changes in the environment at the object which can be different from different positions of the object.

Each block contains the streams of signals at each of these locations along the fiber as it changes over time and wherein analyzing the streams allows analysis of zones as small as the sampling rate of the interrogator, or as large as the entire span.

The streams in each block can comprise raw data from the received signals or the streams are pre-processed such as by filtering or averaging.

In step 16 the second algorithm is applied to the selected block or to each block independently of other blocks and the data from the algorithms is used to check for intrusions at step 11 providing the output 12.

In one example of an algorithm, in a Short Time Fourier Transform step, the sequence of digital samples from each block shown in FIG. 2 at step 15 is converted into a sequence of Fourier Transform coefficients. The incoming signal is first converted into a sequence of fixed-sized temporal sections. The temporal sections are of fixed or constant length. Each fixed sized block of samples has the Fourier Transform applied to generate the Fourier transform coefficients.

The arrangement described above therefore provides a first embodiment of a method for monitoring an optical cable containing an optical fiber 1 for disturbance events of the optical cable within which the fiber is provided.

The method incudes introducing a monitoring optical signal from the transmitter 3 into the optical fiber 1 and receiving optical signals from the optical fiber in the receiver 2 which are modified by disturbance events the optical fiber.

The optical signals are divided into a plurality of data streams S1 to SN, where each data stream is associated with a specific respective portion P1 to PN of the optical fiber with the portions divided along the length of the optical fiber so that each data stream is indicative of disturbances in the respective portion and therefore of disturbances in the optical cable at the respective portion. Each data stream comprises a series of data values representative of the disturbances over time in the respective portion.

A first algorithm 100 is applied to the data streams and in response to the first algorithm 100 a first output 102 is generated by the intrusion detection component 101 related to a disturbance event or events as and when a disturbance event is found by the algorithm.

A second algorithm 14, 15, 10, 11 is applied to the data streams and in response to the second algorithm a second output related to a disturbance event is generated at 12 by component 11 so that in response to the second algorithm a second output is generated related to the disturbance event or events. The second algorithm is different from the first algorithm. In the embodiment above, the second algorithm uses a method in which the streams S1 to SN of data from the fiber are divided into blocks.

This algorithm therefore acts in effect as a pseudo-ZONE system where the data taken from the DAS system is processed using the block selection system into a data stream which provides data corresponding to the conventional ZONE systems described above.

However the second algorithm can alternatively use conventional DAS methods so that the parameters used in the algorithm can be different from those in the first so as to look at the same data in a different manner.

In a control system 104 information defined by the output 12 and the output 102 from the first and second outputs are used to determine if an alarm should be issued.

Thus in one arrangement, the control system 104 can use the second output 12 in a comparison as a double check to confirm an existence of an event determined initially by the output 102, and this comparison can be used to reduce the incidence of false and nuisance alarms.

In the above arrangement, the first algorithm 100 is primary and the second is used by the control system 104 as a secondary check on the first.

As discussed in more detail hereinafter, the control system 104 can use weather data from external data generally indicated at 16 and including one or more of an anemometer 161, a rain gauge 162 of a type responsive to instantaneous rain fall rather than accumulation, and a weather service 163.

Figure 4:
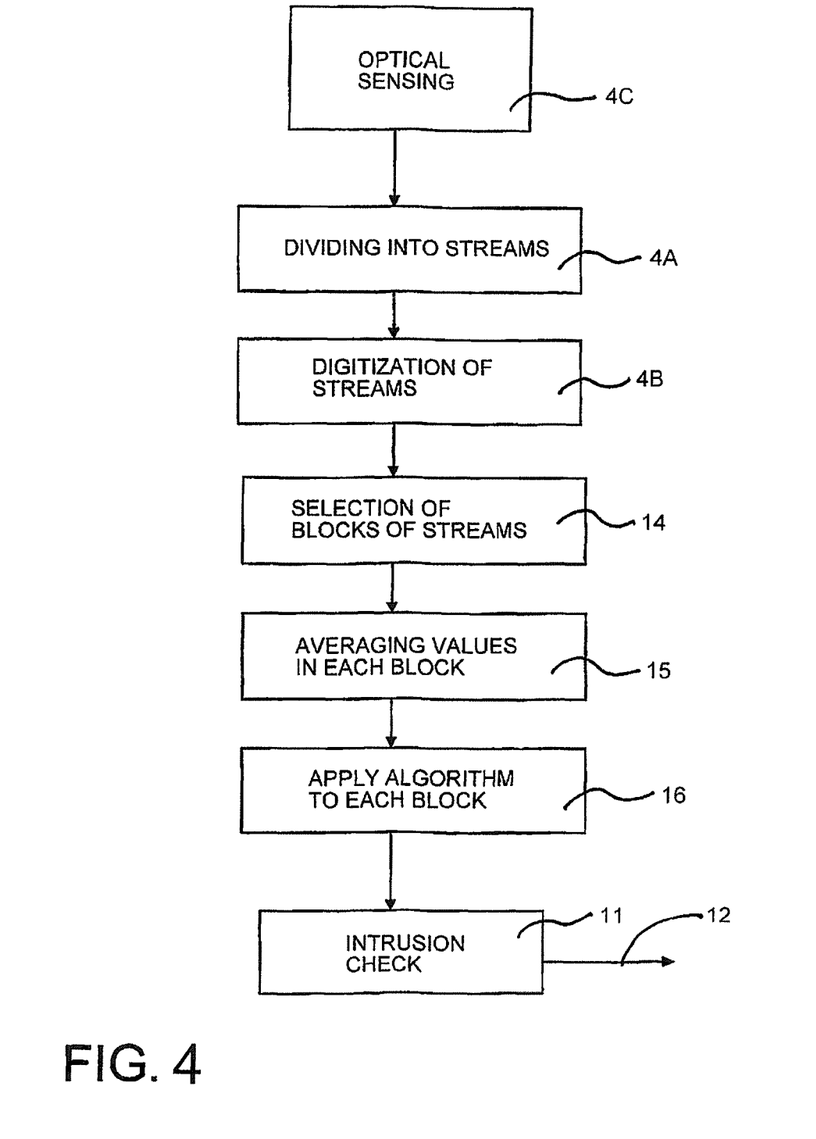
FIG. 4 is a flow chart showing one example of the second algorithm for use in the method of FIG. 3.

In FIG. 4 is shown a schematic illustration of a second embodiment of the apparatus including, as above, a cable 10 containing a plurality of fibers including two selected fibers 11 and 12. Two monitoring systems 13 and 14 are used in an analysis arrangement carried out by a control system on signals received from the two fibers 11, 12 of the monitoring cable 10. The cable 10 is laid along a property to be monitored such as a perimeter fence 101 so as to detect intrusion attempts and other nefarious or intentional disturbances.

Figure 5:
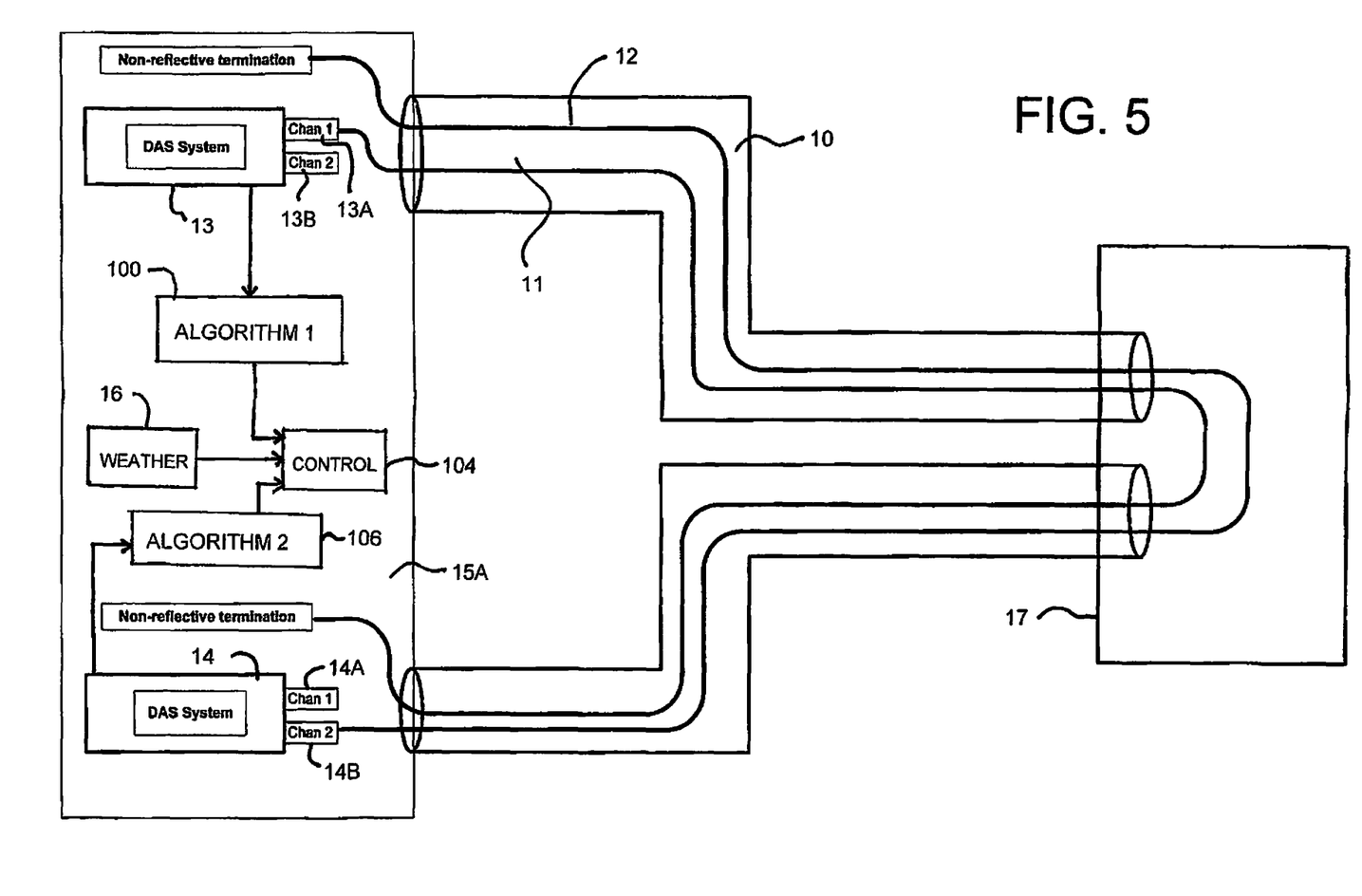
FIG. 5 shows further steps of a second embodiment of the method according to the present invention shown graphically in FIG. 2 including the first and second algorithms using on two separate DAS systems.

In FIG. 5, the two monitoring systems include a DAS system 13 (or other similar system as defined above) and a second system 14. The second system can be, as shown, a similar DAS system or can be, as described hereinafter, a zone system of the type defined above. Either system can be used as the primary system or as the secondary system for comparison or checking as described herein.

The DAS monitoring systems 13 and 14 are in this embodiment divided into two cooperating channels 13A, 13B, 14A and 14B where the signals are introduced into sections of the fiber with the signals entering into the fibers in opposite directions from a head end 15A to a far end 17 and back to the head end using two separate channels 1 and 2 where the fibers are terminated by a non-reflective termination as required for DAS systems.

As is well known and described above in relation to DAS systems, a monitoring optical signal is introduced into the first optical fiber 11 and movement of the fiber causes changes in signals reflected or backscattered in the fiber by Rayleigh backscatter. In this arrangement, a coherent laser pulse is sent along an optic fiber 11, and scattering sites within the fiber cause the fiber to act as a distributed interferometer with a gauge length approximately equal to the pulse length.

The optical signals from the first optical fiber which are modified by disturbance events on the first optical fiber are received and divided into a plurality of data streams, where each data stream is associated with a specific respective portion of the first optical fiber with the portions divided along the length of the first optical fiber so that each data stream is indicative of disturbances in the respective portion and therefore of disturbances in the optical cable at the respective portion. Each data stream thus comprises a series of data values representative of the disturbances over time in the respective portion. An algorithm is applied to the data streams and from that an output is generated indicative of a detection of a disturbance event.

Figure 6:
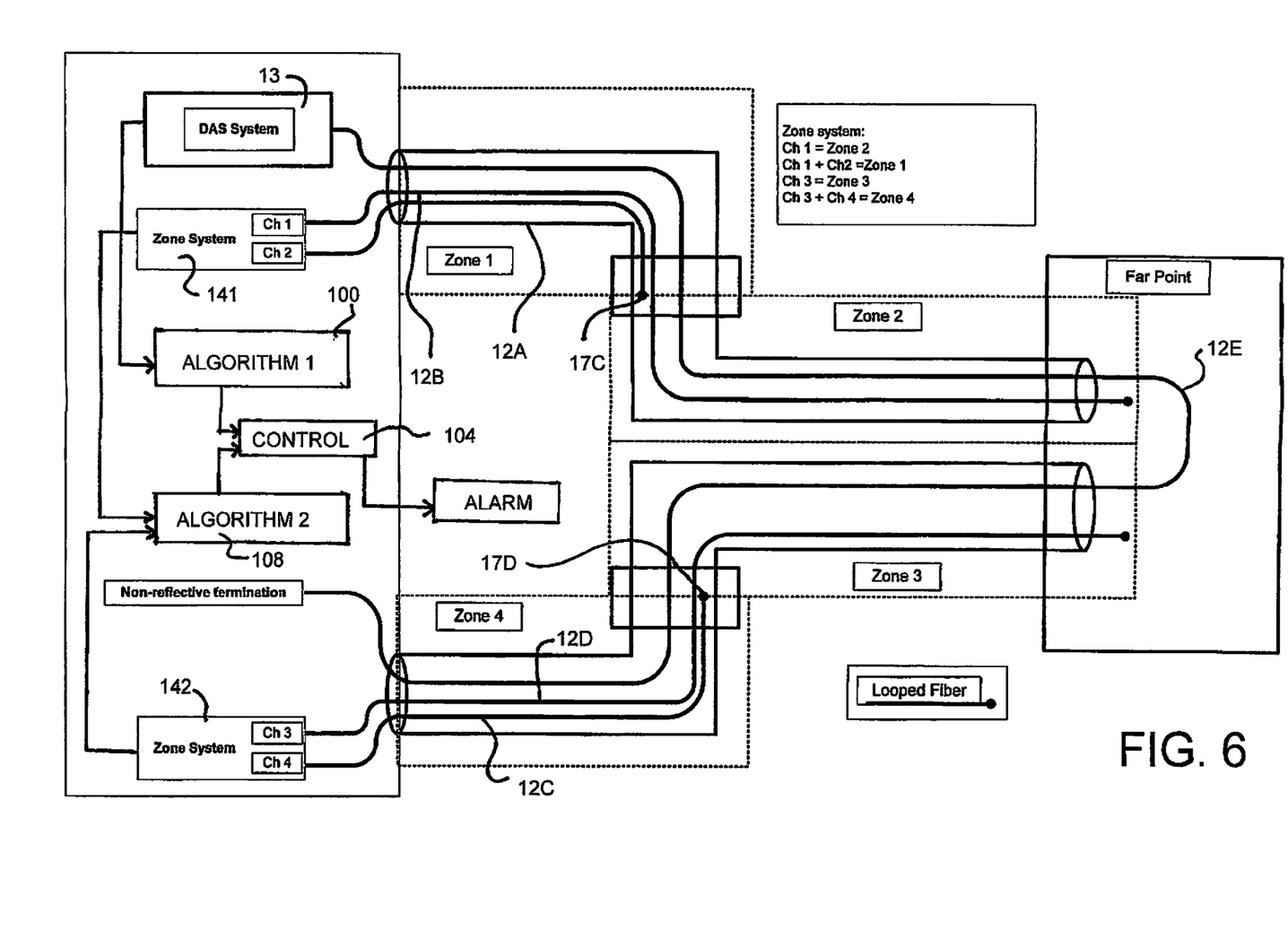
FIG. 6 shows further steps of a third embodiment of the method according to the present invention shown graphically in FIG. 2 including the first and second algorithms using on one DAS system and a ZONE system.
Figure 7:
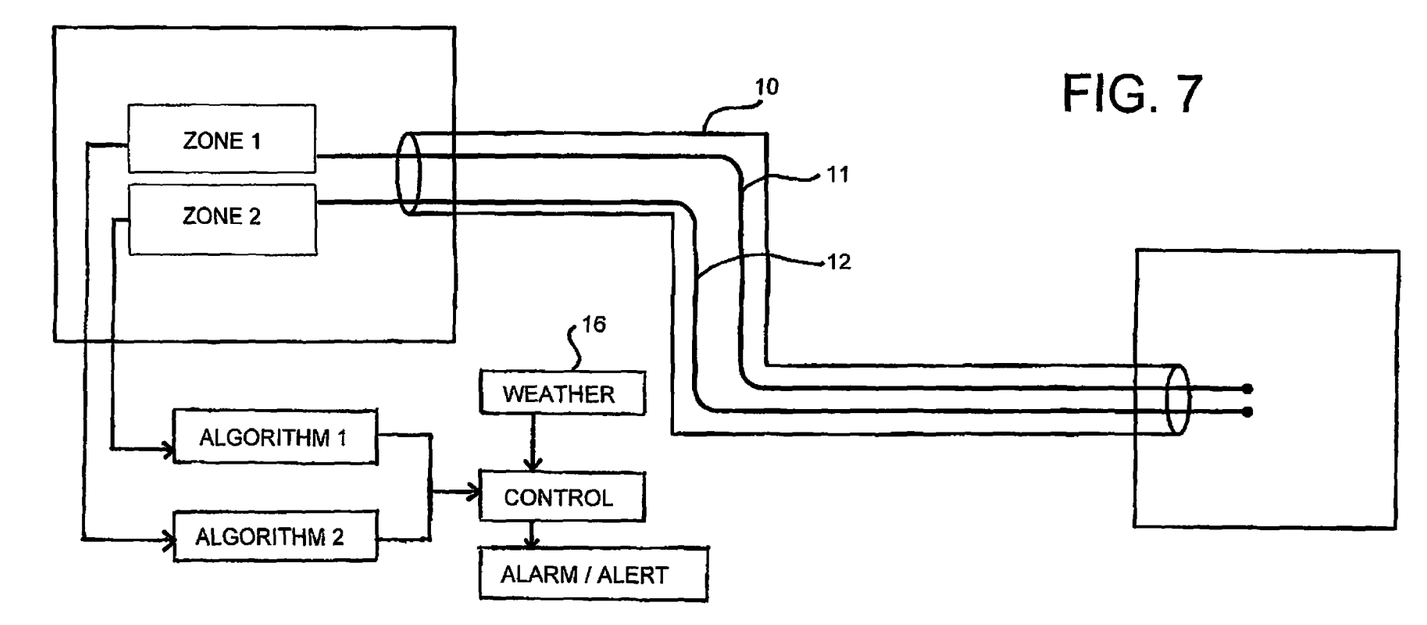
FIG. 7 shows further steps of a fourth embodiment of the method according to the present invention shown graphically in FIG. 2 including the first and second algorithms using two ZONE systems.

In FIG. 6 is shown a further embodiment where the second monitoring system is provided by a zone monitoring system of the type described or defined above. This is formed as quad channel zone system including two sections 141 and 142 divided into four channels 1, 2, 3 and 4.

In this system as is known from U.S. Pat. No. 11,190,271 the zones 11 to 4 contain fiber 12A, 12B, 12C and 12D supplied with signals from the channels 1 to 4. The fibers 12B and 12D are looped back at the end of the zone 2 at loop back termination 12E. The fibers 12A and 12C are terminated at terminations 17C and 17D. Additional zones can be provided with terminations in each zone as is described in detail in the above 271 patent. The zone detection system can thus use the Boolean Logic detection algorithm which allows discriminating locations or distance by analyzing monitored zones in combination as described in the above 271 patent, but this is not essential and the whole length of the fiber 12 can form a single zone.

In the second monitoring system 14 a second monitoring optical signal is thus supplied into the second optical fiber and modified optical signals are received from the second optical fiber which are modified by disturbance events on the second optical fiber. The second system 14 acts to apply an algorithm 108 to the received optical signals on the second optical fiber with the algorithm acting to generate a second output indicative of a detection of a disturbance event.

The signals from the two monitoring systems are supplied to the control system 104 which acts in comparing the first and second outputs to determine if an alarm should be issued.

As shown in FIG. 5 is an arrangement which uses two zone systems as the first and second monitoring systems each using a separate and different algorithm.

The arrangement shown herein thus involves using multiple technologies in combination to utilize the strengths in each while minimizing their shortcomings. This then goes on to use the combination as a double check to confirm existence of an event, thereby reducing the incidence of false and nuisance alarms.

These multiple technologies might be a combination of:

A single DAS system where the DAS output data is analyzed in two separate and distinct algorithms to obtain different information about the events which can be compared in the control system. This can use conventional DAS processing or can use the above described algorithm which in effect provides pseudo-ZONE data.

A DAS system together with a conventional ZONE system;

A dual DAS system using two DAS channels monitoring the same portion of sensor with the same or different parameters or settings, in either the same or opposite rotations about a perimeter. The DAS monitoring with dual dissimilar algorithms can supply virtual or soft dual functionality.

In this implementation as shown, a perimeter, or other situation to be monitored, will be outfitted with, for example, a DAS system and a ZONE system. Some scenarios present themselves:

In the lack of extreme weather, both monitoring systems register an event at the same location of zone, the system interprets this as a high probability of an event and issues an alarm using conventional signaling systems and protocols.

In the lack of extreme weather, if only one monitoring system registers an event, the system interprets this as a moderate probability of an intrusion. Commonly, this is called a warning or alert, and might signal use of a camera or other sensor for verification at the location concerned.

In the presence of extreme weather, if the DAS system registers a very wide alarm size such as an entire length of fence, the system may assume that this is an indication of weather and only rely on the secondary, zone based, monitoring system and issue an alarm in the event that the output is indicative of an event while discarding the outputs from the DAS system which are considered to be suspect in view of the weather.

The existence of extreme weather can be determined by various methods generally indicated at 16 including:
 Weather station such as rain gauge, anemometer, or combination of these;
 Connection to a weather reporting service, such as internet or cloud based;
 Analysis of the DAS size of intrusion. An intrusion that is present across a wide section of a fence, particularly of long duration and/or varying magnitude is likely weather.

In one embodiment the control system treats the ZONE monitor system as primary. In this arrangement, the ZONE monitor system is the primary detection mechanism with both ZONE monitor system and tuned DAS monitoring the cable. When the ZONE monitor system says that there is an alarm, the control system acts as follows:
 Decides the zone where the alarm condition exists using the Boolean logic of the 271 patent, desensitized lead-in fiber, or standard fiber-per-zone architecture;
 Looks for a corresponding alarm or other activity from DAS system in locations corresponding to that zone;
 Looks at sections in the DAS system a certain distance either side of the detected event to determine if confined to a small or predetermined width;
 If the width is greater than the predetermined width, the control system assumes this is a weather event and alerts only to the resolution of an entire zone.
 If an alarm is to be indicated the control system tells the DAS system to look for the most likely event location in a previous time period and in a next time period.

A response to the zone can be effected by activating a Camera.

If less than the predetermined width, the control system acts to:
 assume the signals are valid, and acts to issue an alarm including a report of the precise location;
 Tell the DAS system to look for the most likely event location in the a past time period; and
 Regardless of outcome of DAS, the ZONE monitor system issues the alarm.

In another embodiment the control system treats the DAS monitor system as primary. In this arrangement, the DAS monitor system is the primary detection mechanism with both ZONE monitor system and tuned DAS monitoring the cable. When the DAS monitor system says that there is an alarm, the control system acts as follows:
 The control system looks at lengths of the cable on either side of an event to determine if the event confined to a small width;
 If the event is greater than the defined width, the control system assumes the event is caused by a weather event;
 In this situation the control system acts to confirm alarm with the ZONE monitor system.

If there is no confirmation from the comparison the alarm system does nothing.

If confirmation is provided, the control system acts to tell the DAS system to look for the most likely event location in the past and next time period. A camera response is provided to the selected zone.

If the event is less than the defined width, the event is assumed by the control system to be valid, and the system provides confirmation, an alarm report is issued to the precise location.

In another embodiment there is provided an optional weather reporting system 16 to provide data on the weather conditions. This can be the Anemometer 161, rain gauge 162 or a weather reporting service 163.

In this arrangement the ZONE monitor system and tuned DAS system are used for monitoring the fence as set out above. When the ZONE monitor system says that there is an alarm, the control system asks the anemometer for wind speed. If below a wind speed threshold, the anemometer invokes no further commands. Both the ZONE monitor system and DAS are monitored.

In the event of a detection:

Where both the ZONE monitor system and the DAS system are in agreement, the event is reported including the location.

If only one of the ZONE monitor system or the DAS system reports a disturbance, a yellow or warning is sent to the central monitoring system. In this situation, if the wind speed reported by the anemometer is above the threshold, the anemometer informs the control system, which acts to continue monitoring and alarm off the ZONE monitor system only.

The following set out a plurality of truth tables for the combined DAS system and ZONE system concurrent in same cable or in near proximity. The preferred embodiment includes two fibers alarming per device type. The following criteria are established:

Table stakes: concurrent signal across 10s or 100s of meters (x) indicates deafening wind or heavy rain;

Anemometer or other weather indicator treated below as though DAS>x meters;

"Alarm" means that the system is certain of an intrusion;

"Warning" means possible intrusion response;

A "1" means detected intrusion;

A "0" indicates no intrusion detected.

| | No weather DAS <x meters | | |
|---|---|---|---|
| Cut/Climb Detected by ZONE | Cut/Climb Detected by DAS in SAME zone as ZONE | Cut/Climb Detected by DAS in DIFFERENT zone as ZONE | |
| 0 | 0 | 0 | No alert |
| 0 | 0 | 1 | warning- report location |
| 0 | 1 | 0 | warning- report location |
| 0 | 1 | 1 | warning- report locations |
| 1 | 0 | 0 | warning- report zone |
| 1 | 0 | 1 | Report alarm in location matching ZONEI zone |
| 1 | 1 | 0 | alarm- report location measured by DAS |
| 1 | 1 | 1 | Report alarm(s) in location(s) matching ZONE zone(s) |

| | Bad Weather DAS >x meters indicating bad weather in same zone as ZONE event | | |
|---|---|---|---|
| Cut/Climb Detected by ZONE | Cut/Climb Detected by DAS in SAME zone as ZONE | Cut/Climb Detected by DAS in DIFFERENT zone as ZONE | |
| 0 | 0 | 0 | No alert |
| 0 | 0 | 1 | No alert |
| 0 | 1 | 0 | No alert |
| 0 | 1 | 1 | No alert |
| 1 | 0 | 0 | warning- report zone |
| 1 | 0 | 1 | Report alarm in ZONE zone NOTE 1 |
| 1 | 1 | 0 | Report alarm in ZONE zone NOTE 1 |
| 1 | 1 | 1 | Report alarms in ZONE zones NOTE 1 |

| | Bad Weather DAS >x meters in zone other than ZONE event- No weather at ZONE zone registering alarm | | |
|---|---|---|---|
| Cut/Climb Detected by ZONE | Cut/Climb Detected by DAS in SAME zone as ZONE | Cut/Climb Detected by DAS in DIFFERENT zone as ZONE | |
| 0 | 0 | 0 | No alert |
| 0 | 0 | 1 | warning- report location |
| 0 | 1 | 0 | warning- report location |
| 0 | 1 | 1 | warning- report locations |
| 1 | 0 | 0 | warning- report zone |
| 1 | 0 | 1 | Report alarm in location matching ZONE zone |
| 1 | 1 | 0 | alarm- report location measured by DAS |
| 1 | 1 | 1 | Report alarm(s) in location(s) matching ZONE zone(s) |

The invention claimed is:

1. A method for monitoring an optical cable containing at least one optical fiber for disturbance events of the optical cable comprising:

introducing a monitoring optical signal into said at least one optical fiber;

receiving optical signals from said at least one optical fiber which are modified by disturbance events on said at least one optical fiber;

wherein the optical signals are divided into a plurality of data streams, where each data stream is associated with a specific respective portion of said at least one optical fiber with the portions divided along the length of said at least one optical fiber so that each data stream is indicative of a disturbance event of a plurality of disturbances in the respective portion and therefore of the disturbance event in said at least one optical cable at the respective portion;

wherein each data stream comprises a series of data values representative of the plurality of disturbances over time in the respective portion;

passing the data streams to a first processing path running a first detection algorithm;

passing the data streams to a second processing path running a second detection algorithm;

where the data streams passed to the first and second processing paths are identical;

where the second detection algorithm is different from the first detection algorithm;

applying the first detection algorithm to the data streams and using the first detection algorithm applied to the data streams to generate a first output indicative of the disturbance event;

applying the second detection algorithm to the data streams and using the second detection algorithm applied to the data streams to generate a second output indicative of the disturbance event;

and in a control system using information from the first and second outputs to determine if an alarm should be issued.

2. The method according to claim 1 wherein the control system uses the second output in a comparison as a double check to confirm an existence of the disturbance event, thereby reducing the incidence of false and nuisance alarms.

3. The method according to claim 1 wherein the first detection algorithm is primary and the second detection algorithm is used by the control system as a secondary check on the first output from the first detection algorithm.

4. The method according to claim 1 wherein, when an alarm is issued, the control system requests that a camera is operated to provide images at the location of the disturbance event.

5. The method according to claim 1 wherein the control system includes a component by which weather events on said at least one optical fiber are determined and used in combination with the first and second outputs to determine whether said alarm should be issued.

6. The method according to claim 5 wherein the control system is arranged to issue an alarm as either a warning or as a full alarm condition and wherein the control system obtains the weather conditions and issues said full alarm condition if the first and second detection algorithms both indicate the disturbance event even when the weather conditions exceed a predetermined value and, when only one of the first and second detection algorithms is indicating the disturbance event, the control system, if the weather conditions exceed the predetermined value, issues the warning and does not issue the full alarm condition.

7. The method according to claim 1 wherein the control system is arranged to issue an alarm as either a warning or as a full alarm condition and wherein, when a full alarm condition is not signaled, the detection of the disturbance event is issued as a warning.

8. The method according to claim 1 wherein the second detection algorithm comprises:

selecting for analysis at least one block of the data streams where each selected block of the data streams contains a plurality of data streams so that the selected block is associated with a length of said at least one optical fiber containing a plurality of the portions and so that the plurality of data streams of the selected block are indicative of said disturbances in the length of the selected block;

for each selected block, generating from said data streams of the selected block at least one common data stream containing a plurality of data values so that the common data stream is representative of the disturbances over time in the whole length of the associated selected block;

and applying a further algorithm to the common data stream of each selected block:

wherein the further algorithm comprises carrying out an analysis on the common data stream to create at least one coefficient value dependent on the data values in the common data stream and comparing said at least one coefficient value with a threshold value to generate said second output indicative of said disturbance event.

9. The method according to claim 8 wherein the further algorithm comprises carrying out an analysis on the common data stream to create a series of coefficient values dependent on the data values in the common data stream and comparing each of said coefficient values with a respective threshold value to generate said second output indicative of said detection of said disturbance event.

10. The method according to claim 8 wherein the further algorithm is based on determining differences from ambient disturbances and does not use recorded signatures from sample stimuli applied to said at least one optical fiber.

11. The method according to claim 8 wherein said at least one optical fiber is installed along an object to be monitored and the number of streams in each block is varied depending on detected changes on the object to be monitored and/or changes in the environment at different positions along the object.

12. The method according to claim 8 wherein the further algorithm includes carrying out a frequency and/or time dependent analysis on each block of the streams to create at least one coefficient dependent on the data values, comparing said at least one coefficient with a coefficient value and in response to said comparing generating the output indicative of said detection of an intrusion event.

13. The method according to claim 8 wherein said at least one fiber is divided into separate zones along its length and wherein the second detection algorithm monitors each of the zones independently and determines when an event is detected in which zone the event occurred.

14. The method according to claim 13 wherein the control system looks for alarm from the first monitoring system in a length of said at least one fiber corresponding to that zone.

15. The method according to claim 1 wherein said at least one fiber is used for monitoring a perimeter security system where said at least one optical fiber extends along at least a part of the perimeter security system and said disturbances of said at least one optical fiber are caused in response to intrusion events on the perimeter security system.

16. The method according to claim 1 wherein said at least one optical fiber is a fiber in the cable is used for transmitting data or monitoring data cables such as in a common conveyance and said disturbances of said at least one optical fiber are caused in response to intended intrusion events on the cable.

17. The method according to claim 1 wherein, when the first detection algorithm indicates a disturbance event, the control system looks at locations on either side of a location of the disturbance event to determine if the disturbance event is confined to a pre-determined width and if less than the predetermined width the control system issues an alarm and reports the location and, if the event is greater than the predetermined width, the control system determines that the disturbance event is caused by weather.

18. The method according to claim 1 wherein the optical signals from said at least one optical fiber are received by a Distributed Sensing system such as DAS which detects backscattered signals which are divided into said plurality of data streams.

* * * * *